(12) United States Patent
Mui et al.

(10) Patent No.: US 10,008,713 B2
(45) Date of Patent: Jun. 26, 2018

(54) CURRENT COLLECTOR FOR LEAD ACID BATTERY

(71) Applicant: Gridtential Energy, Inc., Santa Clara, CA (US)

(72) Inventors: Collin Kwok Leung Mui, Mountain View, CA (US); Daniel Jason Moomaw, Santa Clara, CA (US); Peter Gustave Borden, San Mateo, CA (US)

(73) Assignee: Gridtential Energy, Inc., Santa Clara, CA (US)

( * ) Notice: Subject to any disclaimer, the term of this patent is extended or adjusted under 35 U.S.C. 154(b) by 132 days.

(21) Appl. No.: 15/242,206

(22) Filed: Aug. 19, 2016

(65) Prior Publication Data

US 2016/0359164 A1    Dec. 8, 2016

Related U.S. Application Data

(63) Continuation-in-part of application No. PCT/US2015/016622, filed on Feb. 19, 2015, and a
(Continued)

(51) Int. Cl.
*H01M 4/04* (2006.01)
*H01M 4/22* (2006.01)
(Continued)

(52) U.S. Cl.
CPC .............. *H01M 4/22* (2013.01); *C22F 1/10* (2013.01); *C22F 1/18* (2013.01); *C22F 1/183* (2013.01);
(Continued)

(58) Field of Classification Search
CPC .......... H01M 4/22; H01M 2/14; H01M 4/045; H01M 4/0457; H01M 4/049; H01M 4/38;
(Continued)

(56) References Cited

U.S. PATENT DOCUMENTS 4,324,848 A    4/1982  Will
5,302,472 A    4/1994  Ando et al.
(Continued)

FOREIGN PATENT DOCUMENTS

CN    101558512 A    10/2009
CN    103493250 A    1/2014
(Continued)

OTHER PUBLICATIONS

"U.S. Appl. No. 13/994,434, Examiner Interview Summary dated Apr. 2, 2014", 3 pgs.
(Continued)

*Primary Examiner* — Cynthia K Walls
(74) *Attorney, Agent, or Firm* — Schwegman, Lundberg & Woessner, P.A.

(57) ABSTRACT

Apparatus and techniques are described herein for providing a bipolar battery plate such as can be included as a portion of an energy storage device assembly, such as a battery. The bipolar battery plate can include a silicon substrate. A first metal layer can be deposited on a first surface of the rigid silicon substrate, and a different second metal layer can be deposited on a second surface of the rigid silicon substrate opposite the first surface. The first and second metal layers can be annealed to form a first silicide on the first surface and a different second silicide on the second surface of the rigid silicon substrate.

20 Claims, 9 Drawing Sheets

Related U.S. Application Data continuation-in-part of application No. 14/477,312, filed on Sep. 4, 2014, now Pat. No. 9,570,737, which is a continuation of application No. 13/994,434, filed as application No. PCT/US2012/037598 on May 11, 2012, now Pat. No. 8,828,582.

(60) Provisional application No. 61/941,756, filed on Feb. 19, 2014, provisional application No. 61/484,854, filed on May 11, 2011, provisional application No. 61/525,068, filed on Aug. 18, 2011.

(51) Int. Cl.

| | | |
|---|---|---|
| *C22F 1/10* | (2006.01) | |
| *C22F 1/18* | (2006.01) | |
| *C23C 30/00* | (2006.01) | |
| *H01M 4/66* | (2006.01) | |
| *H01M 4/68* | (2006.01) | |
| *H01M 10/18* | (2006.01) | |
| *H01M 2/14* | (2006.01) | |
| *H01M 4/38* | (2006.01) | |
| *H01M 4/56* | (2006.01) | |
| *H01M 10/04* | (2006.01) | |
| *H01M 4/82* | (2006.01) | |
| *H01M 10/14* | (2006.01) | |
| *H01M 4/02* | (2006.01) | |

(52) U.S. Cl.
CPC ............... *C23C 30/00* (2013.01); *H01M 2/14* (2013.01); *H01M 4/0404* (2013.01); *H01M 4/045* (2013.01); *H01M 4/0426* (2013.01); *H01M 4/0457* (2013.01); *H01M 4/0492* (2013.01); *H01M 4/38* (2013.01); *H01M 4/56* (2013.01); *H01M 4/667* (2013.01); *H01M 4/68* (2013.01); *H01M 4/82* (2013.01); *H01M 10/0418* (2013.01); *H01M 10/14* (2013.01); *H01M 10/18* (2013.01); *H01M 2004/021* (2013.01); *H01M 2004/029* (2013.01); *H05K 999/99* (2013.01); *Y10T 29/4911* (2015.01)

(58) Field of Classification Search
CPC .. H01M 4/56; H01M 4/0426; H01M 10/0418; H01M 4/82; H01M 10/14; H01M 4/68; H01M 4/0404; H01M 4/667; H01M 10/18; H01M 2004/021; H01M 2004/029; C23C 30/00; C22F 1/10; C22F 1/183; C22F 1/18; H05K 999/99; Y10T 29/4911
See application file for complete search history.

(56) References Cited

U.S. PATENT DOCUMENTS

| | | | |
|---|---|---|---|
| 5,595,839 A | 1/1997 | Hossain | |
| 5,837,601 A | 11/1998 | Matsumoto | |
| 6,500,585 B1 | 12/2002 | Saakes et al. | |
| 7,473,488 B2 | 1/2009 | Knight et al. | |
| 7,479,466 B2 | 1/2009 | Lu et al. | |
| 8,633,373 B2 | 1/2014 | Greiff et al. | |
| 8,828,582 B2 | 9/2014 | Borden | |
| 2007/0111090 A1 | 5/2007 | Cardenas-valencia et al. | |
| 2007/0139001 A1 | 6/2007 | Hahn | |
| 2007/0269718 A1 | 11/2007 | Krause et al. | |
| 2008/0090129 A1 | 4/2008 | Kunz et al. | |
| 2009/0061319 A1* | 3/2009 | Kim ................. | H01M 4/366 429/220 |
| 2010/0062335 A1 | 3/2010 | Datta | |
| 2010/0330411 A1 | 12/2010 | Nam et al. | |
| 2014/0079985 A1 | 3/2014 | Borden | |
| 2014/0370369 A1 | 12/2014 | Borden | |

FOREIGN PATENT DOCUMENTS

| | | |
|---|---|---|
| GB | 1394694 A | 5/1975 |
| GB | 1394694 A | 5/1975 |
| JP | 60-101867 A | 6/1985 |
| JP | 61283173 A | 12/1986 |
| JP | H05135761 A | 6/1993 |
| JP | 07142054 A | 6/1995 |
| JP | 08241707 A | 9/1996 |
| JP | 2006040722 A | 2/2006 |
| JP | 2007335198 A | 12/2007 |
| JP | 2007335206 A | 12/2007 |
| JP | 2014507774 A | 3/2014 |
| JP | 5634623 B2 | 10/2014 |
| JP | 2015028954 A | 2/2015 |
| KR | 1020090093191 A | 9/2009 |
| KR | 1020130114736 A | 10/2013 |
| KR | 101590529 B1 | 2/2016 |
| KR | 1020160017108 A | 2/2016 |
| WO | WO-2008059529 A1 | 5/2008 |
| WO | WO-2011109477 A2 | 9/2011 |
| WO | WO-2012155082 A1 | 11/2012 |
| WO | WO-2012155082 A1 | 11/2012 |
| WO | WO-2015127081 A1 | 8/2015 |

OTHER PUBLICATIONS

"U.S. Appl. No. 13/994,434, Final Office Action dated Apr. 15, 2014", 9 pgs.
"U.S. Appl. No. 13/994,434, Non Final Office dated Dec. 31, 2013", 12 pgs.
"U.S. Appl. No. 13/994,434, Notice of Allowance dated Jun. 24, 2014", 7 pgs.
"U.S. Appl. No. 13/994,434, Preliminary Amendment filed Jun. 14, 2013", 7 pgs.
"U.S. Appl. No. 13/994,434, Response filed Mar. 27, 2014 to Non Final Office Action dated Dec. 31, 2013", 12 pgs.
"U.S. Appl. No. 13/994,434, Response filed May 16, 2014 to Final Office Action dated Apr. 15, 2014", 10 pgs.
"U.S. Appl. No. 14/477,312, Notice of Allowance dated Oct. 28, 2016", 9 pgs.
"U.S. Appl. No. 14/477,312, Preliminary Amendment filed Sep. 22, 2014", 7 pgs.
"U.S. Appl. No. 14/477,312, Preliminary Amendment filed Oct. 18, 2016", 3 pgs.
"U.S. Appl. No. 14/667,240, Notice of Allowance dated Apr. 21, 2016", 9 pgs.
"Canadian Application Serial No. 2,825,921, Office Action dated Jan. 20, 2015", 8 pgs.
"Canadian Application Serial No. 2,825,921, Office Action dated Oct. 20, 2015", 3 pgs.
"Canadian Application Serial No. 2,825,921, Response filed Nov. 19, 2015 to Office Action dated Oct. 20, 2015", 15 pgs.
"Canadian Application Serial No. 2,825,921, Response filed Jul. 7, 2015 to Office Action dated Jan. 20, 2015", 19 pgs.
"Chinese Application Serial No. 201280009851.1, Office Action dated Apr. 22, 2015", w/ English Translation, 12 pgs.
"Chinese Application Serial No. 201280009851.1, Office Action dated Aug. 31, 2015", w/ English Translation, 2 pgs.
"Chinese Application Serial No. 201280009851.1, Response filed Jan. 15, 2016 to Office Action dated Aug. 31, 2015", with English translation of claims, 10 pgs.
"Chinese Application Serial No. 201280009851.1, Response filed Jul. 15, 2015 to Office Action dated Apr. 22, 2015", w/ English Claims, 41 pgs.
"Chinese Application Serial No. 201280009851.1, Voluntary Amendment filed May 9, 2014", w/English specification and claims, 29 pgs.
"European Application Serial No. 12722634.8, Examination Notification Art. 94(3) dated Dec. 11, 2014", 5 pgs.
"European Application Serial No. 12722634.8, Office Action dated Mar. 27, 2014", 6 pgs.
"European Application Serial No. 12722634.8, Response filed Aug. 1, 2014 to Office Action dated Mar. 27, 2014", 13 pgs.

(56) References Cited

OTHER PUBLICATIONS

"European Application Serial No. 12722634.8, Response filed Apr. 13, 2015 to Examination Notification Art. 94(3) dated Dec. 11, 2014", 15 pgs.
"European Application Serial No. 15198173.5, Extended European Search Report dated Mar. 30, 2016", 9 pgs.
"International Application Serial No. PCT/US2012/037598, International Preliminary Report on Patentability dated Jul. 23, 2013", 12 pgs.
"International Application Serial No. PCT/US2012/037598, International Search Report dated Jul. 23, 2012", 3 pgs.
"International Application Serial No. PCT/US2012/037598, Written Opinion dated Jul. 23, 2012", 8 pgs.
"International Application Serial No. PCT/US2012/037598, Written Opinion of the International Preliminary Examining Authority, dated Apr. 18, 2013", 6 pgs.
"International Application Serial No. PCT/US2015/016622, International Preliminary Report on Patentability dated Sep. 1, 2016", 9 pgs.
"International Application Serial No. PCT/US2015/016622, International Search Report dated May 20, 2015", 2 pgs.
"International Application Serial No. PCT/US2015/016622, Written Opinion dated May 20, 2015", 7 pgs.
"Japanese Application Serial No. 2013-552743, Office Action dated Jan. 20, 2014", w/ English Translation, 4 pgs.
"Japanese Application Serial No. 2013-552743, Office Action dated May 20, 2014", w/English translation, 4 pgs.
"Japanese Application Serial No. 2013-552743, Response filed Apr. 21, 2014 to Office Action dated Jan. 21, 2014", w/English claims, 13 pgs.
"Japanese Application Serial No. 2013-552743, Response filed Aug. 18, 2014 to Office Action dated May 20, 2014", w/English claims, 9 pgs.
"Japanese Application Serial No. 2014-209992, Office Action dated Apr. 26, 2016", with English translation of claims, 5 pgs.
"Japanese Application Serial No. 2014-209992. Office Action dated Dec. 15, 2015", with English translation, 8 pgs.
"Japanese Application Serial No. 2014-209992, Response filed Mar. 28, 2016 to Office Action dated Dec. 15, 2015", with English translation of claims, 6 pgs.
"Korean Application Serial No. 10-2013-7021903, Office Action dated Feb. 9, 2015", w/ English Claims, 15 pgs.
"Korean Application Serial No. 10-2013-7021903, Response filed Aug. 7, 2015 to Office Action dated Feb. 9, 2015", w/ English Claims, 27 pgs.
"Korean Application Serial No. 10-2016-7002096, Office Action dated Apr. 14, 2016", with English translation of claims, 10 pgs.
"Korean Application Serial No. 10-2016-7002096, Response filed Jun. 14, 2016 to Office Action dated Apr. 14, 2016", (English Translation of Claims), 16 pgs.
Ottaviani, G, et al., "Reliability and degradation: Mechanisms and interfacial layers in silicide formation", John Wiley & Sons Ltd, (1981), 105-149.

\* cited by examiner

CURRENT COLLECTOR FOR LEAD ACID BATTERY

CLAIM OF PRIORITY

This application is a Continuation-in-Part and claims benefit of Moomaw et al., International Patent Application Serial Number PCT/US2015/016622, titled "CURRENT COLLECTOR FOR LEAD ACID BATTERY," filed Feb. 19, 2015 which claims the benefit of priority of U.S. Provisional Application Ser. No. 61/941,756, titled "CURRENT COLLECTOR FOR LEAD ACID BATTERY," filed on Feb. 19, 2014, the benefit of each of which is hereby presently claimed, and the entirety of each of which is hereby incorporated by reference herein; and this application is a Continuation-in-Part and claims the benefit of Borden, U.S. patent application Ser. No. 14/477,312, titled "WAFER-BASED BIPOLAR BATTERY PLATE, filed Sep. 4, 2014, which is a continuation of and claims priority to Borden, U.S. patent application Ser. No. 13/994,434, titled "BATTERY AND ASSEMBLY METHOD," filed 14 Jun. 2013, which application is a U.S. National Stage Filing under 35 U.S.C. § 371 of International Patent Application Serial No. PCT/US2012/037598, titled "AN IMPROVED BATTERY AND ASSEMBLY METHOD," filed on May 11, 2012, and published on Nov. 15, 2012, as WO 2012/155082, which claims the benefit of priority, under 35 U.S.C. Section 119(e), to Borden, U.S. Provisional Application Ser. No. 61/484,854, titled "BATTERY AND ASSEMBLY METHOD," filed on May 11, 2011 and Borden, U.S. Provisional Application Ser. No. 61/525,068, titled "BATTERY AND ASSEMBLY METHOD," filed on Aug. 18, 2011, the benefit of each of which is hereby presently claimed, and the entirety of each of which is hereby incorporated by reference herein.

BACKGROUND

The lead acid battery can be considered the earliest type of rechargeable battery, and lead acid chemistry remains the most commonly used battery chemistry. The active materials in a lead acid battery generally include lead dioxide ($PbO_2$), lead (Pb), and sulfuric acid ($H_2SO_4$) which also acts as the electrolyte. To assemble a lead acid battery, $PbO_2$ and Pb active materials can be pasted and cured onto monopolar lead current collectors to form positive and negative plates, from which an electrochemical cell can be formed with $H_2SO_4$ electrolyte. The cells are generally arranged electrically in a parallel configuration such that the voltage of the battery is proportional to the number of cells in the battery pack.

OVERVIEW

Another configuration for a lead acid battery is a bipolar configuration, in which the cells are generally arranged electrically in series. In the bipolar configuration, bipolar plates can be fabricated with positive and negative active materials on opposing sides of a plate. The plates can be stacked such that a negative electrode of one cell serves as a positive electrode of the next cell in series.

Apparatus and techniques are described herein for providing a bipolar battery plate such as can be included as a portion of an energy storage device assembly, such as a battery. The bipolar battery plate can include a silicon substrate. A first metal layer can be deposited on a first surface of the rigid silicon substrate, and a different second metal layer can be deposited on a second surface of the rigid silicon substrate opposite the first surface. The first and second metal layers can be annealed to form a first silicide on the first surface and a different second silicide on the second surface of the rigid silicon substrate.

In an example, annealing of the first and second metal layers to form the first and second silicides can include annealing the silicon wafer using a temperature range sufficient to form both silicide layers contemporaneously. In another example, annealing the first and second metal layers can include annealing the first metal layer to form the first silicide using a first annealing temperature range, and separately annealing the second metal layer to form the second silicide using a second annealing temperature range. For example, a peak of the second annealing temperature range can be specified to be lower than temperatures within the first annealing temperature range, such that the first silicide remains stable within the second annealing temperature range.

This overview is intended to provide an overview of subject matter of the present patent application. It is not intended to provide an exclusive or exhaustive explanation of the invention. The detailed description is included to provide further information about the present patent application.

Figure 1A:
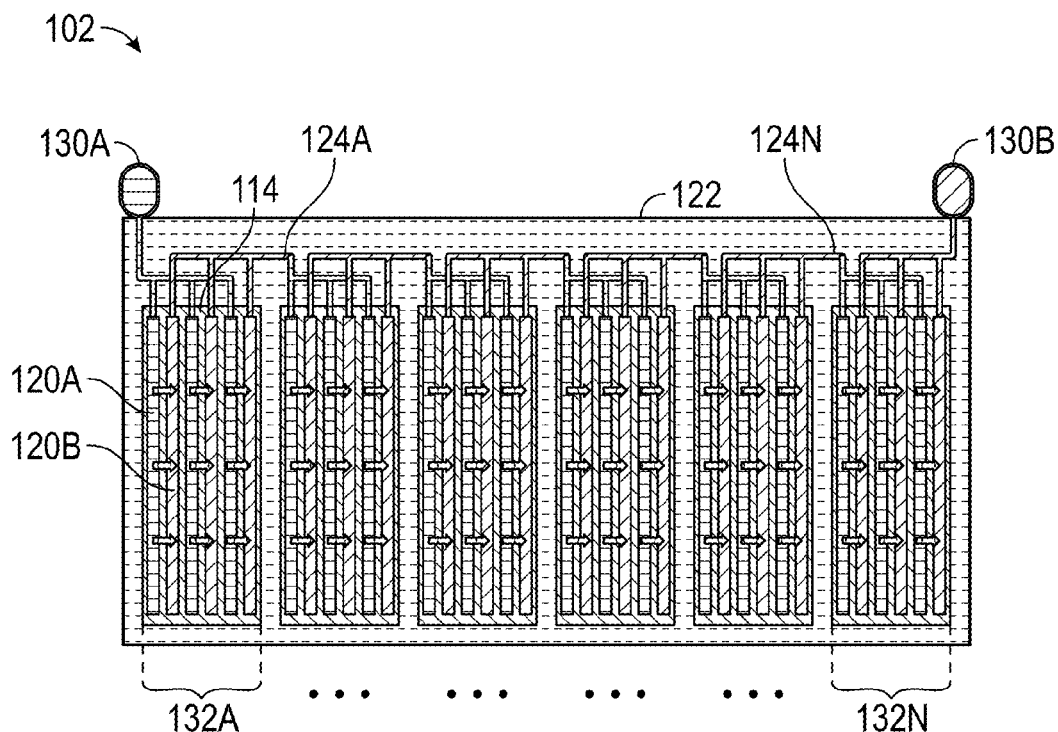
FIGS. 1A and 1B illustrate generally examples of a monopolar battery architecture and a bipolar battery architecture.

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1B:
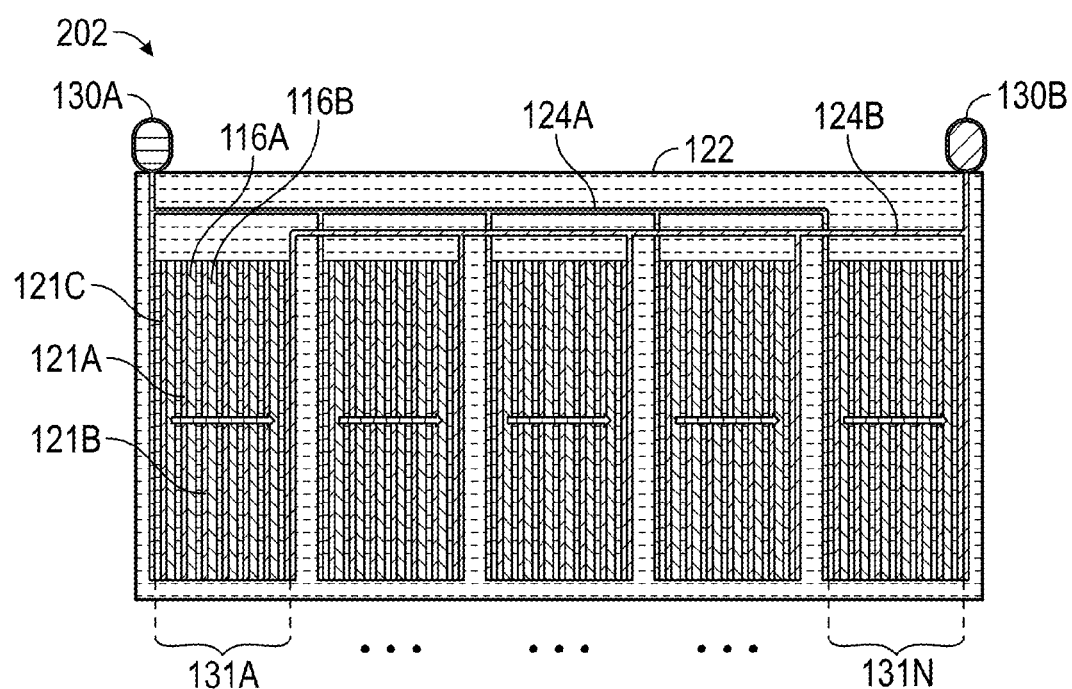

FIGS. 1A and 1B illustrate generally examples of a monopolar battery architecture 102 and a bipolar battery architecture 202. In a monopolar configuration, a current collector generally includes an active material of a single polarity (e.g., positive or negative) applied to both (e.g. opposite) sides of the current collector, such as including application of the active material in paste form. A positive-negative pair can be formed such as including the first plate 120A having a first polarity active material and a second plate 120B having an opposite second polarity active material, to form an electrochemical cell in the electrolyte 114, such as shown illustratively in FIG. 1A. In a lead-acid example, such a single cell voltage can be around 2.1V. A number of cells can be arranged electrically in parallel configuration as a stack 132A. Individual stacks 132A through 132N can be connected in series to assemble a battery pack 102.

In FIG. 1A, a first terminal 130A can provide a first polarity, and a second terminal 130B can provide an opposite second polarity. The first and second terminals can be coupled to the first stack 132A and last stack 132N, respectively, and the stacks can be coupled together serially using a first bus 124A through an "Nth" bus 124N. By contrast with FIG. 1A, a battery architecture 202, as shown illustratively in FIG. 1B using a bipolar plate configuration, can provide a simpler configuration. Respective positive and negative active materials can be applied, such as through pasting, onto opposite sides of the current collector to form a bipolar plate.

FIG. 1B illustrates generally an example that can include a battery pack 202 having one or more bipolar battery plates, such as bipolar plates 121A, 121B, and 121C. The bipolar plates 121A, 121B, or 121C can include different silicide layers on opposite sides of the plate assembly, such as shown and described in other examples herein.

As in FIG. 1A, a first terminal 130A can provide a first polarity, and a second terminal 130B can provide an opposite second polarity. The bipolar plates can be sandwiched with electrolyte in regions 116A and 116B, for example, to form sealed cells. In an example, an electrolyte in region 116A can be one or more of fluidically isolated or hermetically sealed so that electrolyte cannot bypass the bipolar plate 121A to an adjacent region such as the electrolyte region 116B, or to suppress or inhibit leakage of electrolyte from the pack 202. As shown illustratively in FIG. 1B, cells can be disposed in a series configuration. The cells can be aligned to form a stack 131A.

In a bipolar architecture, a current collector (e.g., a silicon substrate 104 such as included as a portion of the bipolar plate 121A) can be shared between the negative electrode of one cell and a positive electrode of the next. A first bus 124A can connect to a first electrode in each stack 131A through 131N, and a second bus 124B can connect to an opposite electrode in each stack 131A through 131N. By contrast with FIG. 1A, the stacks 131A through 131N can each provide serial connections through the bulk of the conductive silicon substrates as shown by the arrows. In this manner, a total number of interconnect buses external to the stack 131A through 131N can be reduced as compared to an architecture using monopolar plates.

Other configurations of interconnecting one or more stacks 131A through 131N can be used. For example, bipolar stacks 131A through 131N can be connected in parallel for lower voltage applications, such as to assemble a lower voltage battery pack. Alternatively, a single bipolar stack with many cells can form a higher-voltage pack.

The bipolar configuration of FIG. 1B can provide advantages as compared to the monopolar configuration of FIG. 1A. For example, a bipolar configuration can be simpler because electrical circuits and control systems to regulate the operation of parallel cells in a monopolar battery can be eliminated. As another example, because an entirety or nearly an entirety of a bipolar plate 121A can be used for electrical conduction inside the battery, a higher current density and therefore a higher power delivered can be achieved using a bipolar battery assembly of comparable mass to a corresponding monopolar battery assembly. As another example, lead metal grids are not generally used as current collectors in a bipolar lead acid battery configuration, so a stronger and lighter substrate material for a current collector can provide significant improvement in energy density of the battery.

In addition to electrical conduction, a bipolar current collector substrate generally isolates electrolyte between adjacent cells inside the battery, and generally the materials used for the current collector are specified to suppress or inhibit corrosion when immersed or surrounded in the electrolyte (e.g., $H_2SO_4$) throughout the lifetime of the battery. Electrically, a current collector substrate can be specified to include a high electronic conductivity but a low ionic conductivity such that it acts as a current collector which also isolates an intercell through-diffusion of electrolyte. Chemically, the substrate can be specified to resist $H_2SO_4$ corrosion, and its surface can be specified to be inert towards passivation in $H_2SO_4$. Such passivation can render the current collector non-conductive.

Electrochemically, the current collector surface is generally specified to have a wider and more stable potential window as compared to the charge and discharge electrochemical reactions of the battery. Specifically, in the example of a lead acid chemistry, the cathode and anode surfaces are generally specified to have higher oxygen and hydrogen evolution over-potentials than those on $PbO_2$ and Pb, respectively, and the over-potentials are specified to be relatively stable throughout the lifetime of the battery. The high over-potentials can help to reduce or minimize gas evolution due to water electrolysis side reactions at the electrodes. Such side reactions can lead to one or more of coulombic efficiency reduction, active material loss, capacity fade, or premature failure of the battery.

Previous attempts to develop substrate materials for bipolar lead acid batteries suffer from different obstacles. Although lead metal can be used, lead is a relatively soft metal, and it corrodes in $H_2SO_4$. Most other metals, although electronically conductive, either corrode or passivate in $H_2SO_4$. Composite materials, despite having a wide variety of composition and property options, often suffer from one or more of low electronic or high ionic conductivities.

The present inventors have recognized, among other things, that silicon can be used, such as a substrate, for a current collector for a bipolar lead acid battery. For example, silicon wafers are readily available in different sizes and shapes, and are widely used in different industries. Monocrystalline or poly-crystalline silicon are generally impervious to $H_2SO_4$, and can be doped to achieve a specified conductivity. Although an insulating oxide can form on a silicon surface, a variety surface modification processes can be used to provide desired chemical and electrochemical surface properties. For example, a metal silicide can be formed on a silicon surface by annealing a metal thin film deposited on the surface. A metal silicide generally forms a low resistivity ohmic contact with the silicon, protects the underlying silicon from oxidation or passivation, and extends an electrochemical stability window of the surface. One or more thin films can be deposited onto the substrate to enhance its surface properties towards active material adhesion, such as one or more thin films deposited after silicide formation.

Figure 2:
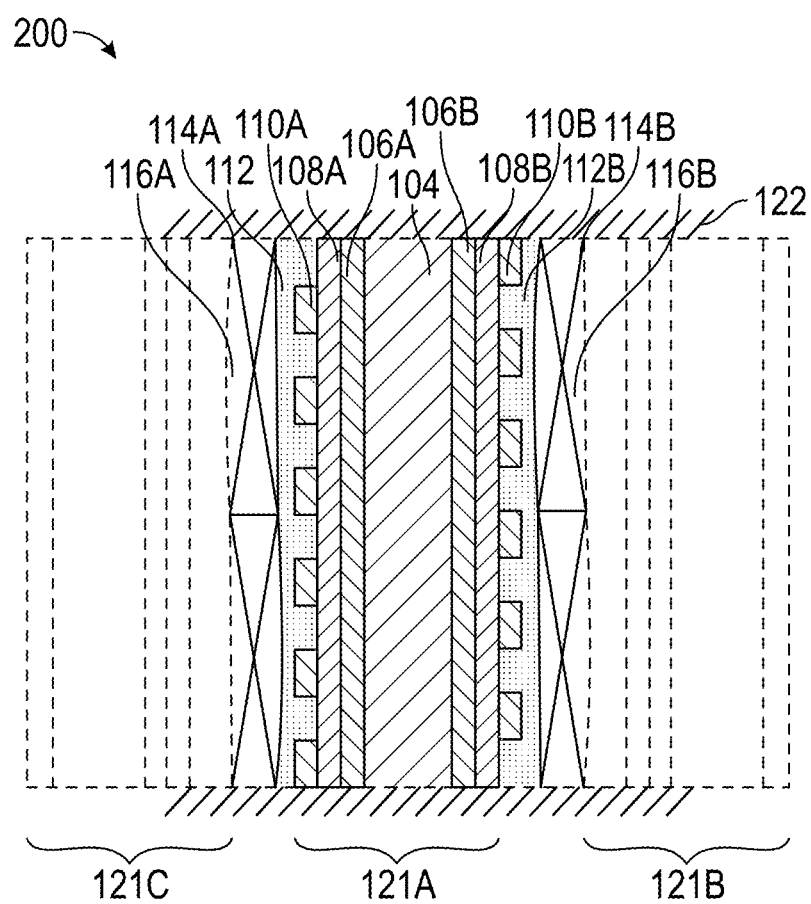
FIG. 2 illustrates generally a section view of an example including a bipolar battery plate, such as can be included as a portion of a bipolar battery assembly.

FIG. 2 illustrates generally a section view of an example including a bipolar battery plate 121A, such as can be included as a portion of a bipolar battery assembly 200. The first bipolar battery plate 121A can include a rigid conductive silicon substrate 104 as a current collector. The silicon substrate 104 can include a circular, clipped, square, or rectangular configuration, such as including a thin wafer. The silicon substrate 104 can include semiconductor grade, solar grade, or metallurgical grade silicon, and the silicon substrate 104 need not be mono-crystalline. The silicon substrate 104 can include one or more dopants or impurities, such as to enhance a bulk conductivity of the substrate 104.

The bipolar battery plate 121A can include one or more of an ohmic contact layer 106A and an adhesion layer 108A located at or near a first surface of the conductive silicon wafer 104. An active material 112A can be applied or deposited on the plate 121A, such as including a first polarity, such as supported during or after fabrication by a mechanical support 110A. A second ohmic contact layer 106B can be included on a second surface of the conductive silicon wafer 104 opposite the first surface. The second ohmic contact layer 106B can include the same material as the first ohmic contact layer 106A or a different material, such as to provide an electrode for connection to other portions of a battery assembly, to provide a corrosion-resistant layer, or to provide a mirror image configuration having a stack-up similar to the first surface of the conductive silicon wafer 104. A second adhesion layer 108B can also be included. A second active material 112B can be included, such as having a polarity opposite the first active material 112A. The first and second contact layers 106A and 106B can be formed using one or more techniques described elsewhere herein, such as including sequentially or contemporaneously annealed silicide layers.

A first electrolyte region 116A can separate the battery plate 121A from an adjacent battery plate 121C, and a second electrolyte region 116B can separate the battery plate 121A from another adjacent battery plate 121B. The electrolyte regions 116A and 116B can include a separator, such as assist in maintaining a specified separation between the battery plates. The electrolyte regions 116A and 116B are generally fluidically isolated from each other so that conduction occurs serially through a bulk of the conductive silicon substrate 104.

The first and second active materials 112A and 112B can include positive and negative active materials, respectively, such as located (e.g., formed or deposited) on opposite sides of the bipolar plate 121A as shown illustratively in FIG. 2. Surface modification processes applied to the silicon wafer substrate can be specified to provide a surface compatible with both cathode and anode electrochemistry. However, in some configurations different surface modifications can be used for the two sides of the bipolar substrate. For example, the present inventors have also recognized that it may be beneficial to tailor surface chemical and electrochemical properties for the cathode and anode side of the substrate 104 independently, such as with respective (e.g., different) surface modifications corresponding to the anode side versus the cathode side.

To form different metal silicides onto the opposite sides of the substrate 104, a number of approaches can be used. In one a approach, a metal film can be deposited onto one side, followed by depositing the second metal film onto the other side of the substrate. The substrate can then be annealed to convert both metal films to metal silicides. However, different metal silicides can have different sintering (conversion) temperatures, and it may not be possible to anneal at the same temperature two different silicides with electrochemical characteristics desirable for cathode and anode use. In such an example, a metal with a higher sintering temperature, which is stable to higher temperature, can be deposited onto one side of the silicon substrate 104 and annealed to form a first metal silicide. The second metal can then deposited onto the opposite side of the substrate 104, and the substrate 104 can then be annealed at the lower sintering temperature, at which the first silicide is stable, to form a second silicide.

Similarly, respective (e.g., different) film stacks can be deposited onto the opposite sides of the bipolar substrate to improve adhesion of the positive and negative active materials on the two sides of the bipolar plate 121A. To assemble a bipolar lead acid battery, modified silicon current collector substrates can be fabricated with positive and negative active materials, sealed to isolate individual cells, stacked with separators, and filled with electrolytes, such as in a manner in which the cells are in a series configuration as shown illustratively in the bipolar stacks of FIG. 1A and the example of FIG. 2.

Figure 3A:
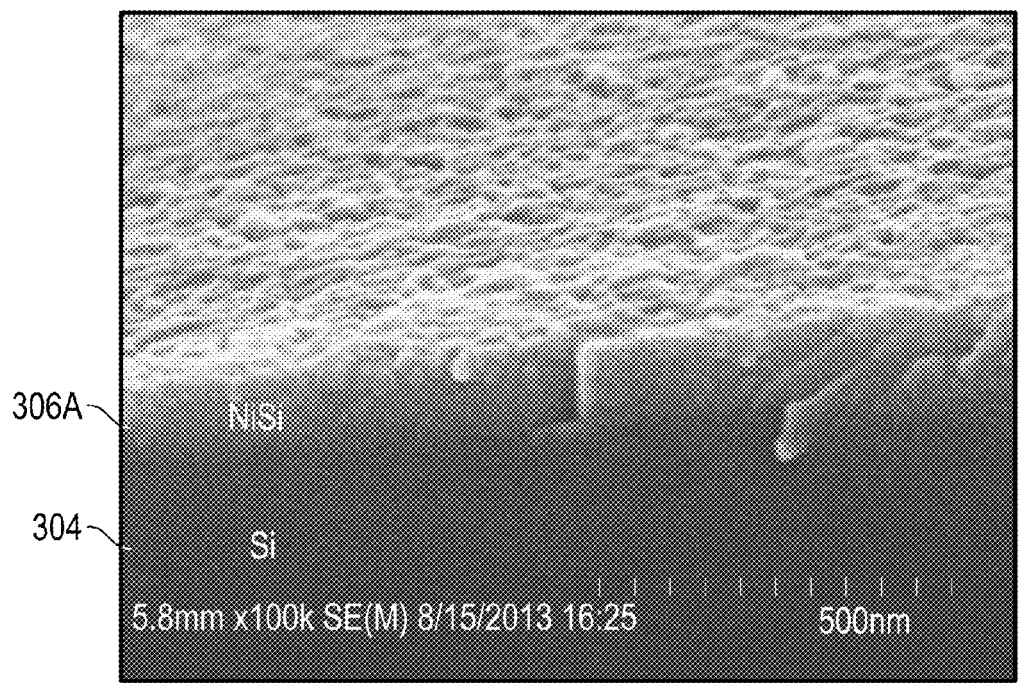
FIGS. 3A and 3B illustrate generally scanning electron micrographs of silicides formed upon silicon, with a nickel silicide (NiSi) layer shown in FIG. 3A and a titanium silicide ($TiSi_2$) layer shown in FIG. 3B.
Figure 3B:
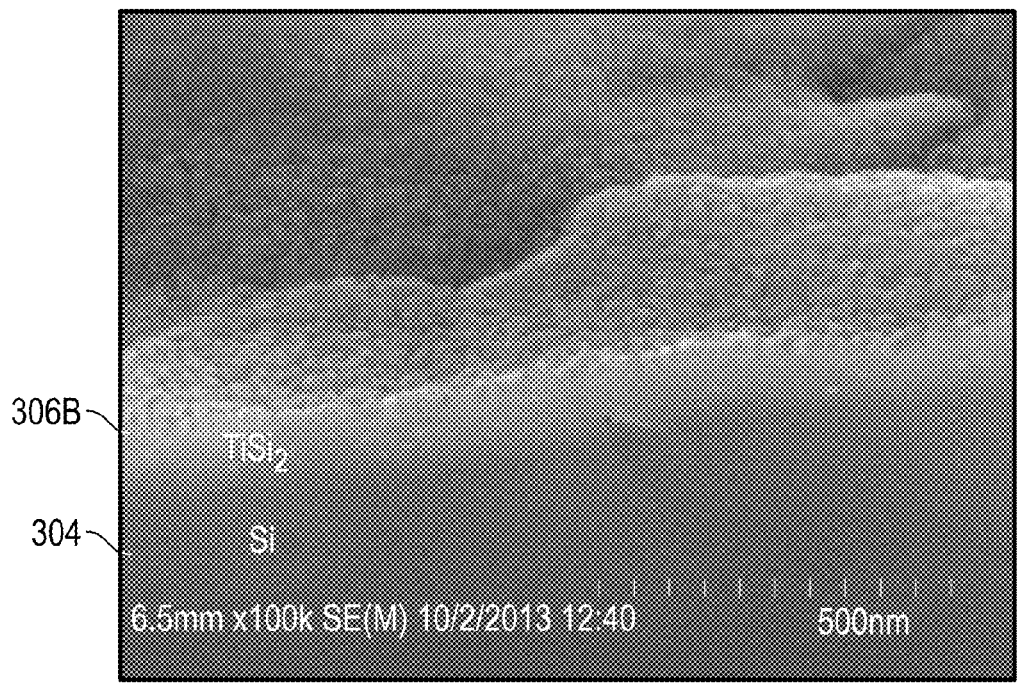

FIGS. 3A and 3B illustrate generally scanning electron micrographs of silicides formed upon silicon, with a nickel silicide (NiSi) layer shown in FIG. 3A and a titanium silicide ($TiSi_2$) layer shown in FIG. 3B. As mentioned above, a bipolar battery plate can be fabricated including a substrate material such as silicon as a base material for the current collector, such as for use in a bipolar lead acid battery. According to various examples, one or more thin film materials can be formed on a rigid conductive silicon substrate, such as to render the substrate surface suitable for use in an environment internal to a lead acid battery. In an example, such a current collector (e.g., for a bipolar lead acid battery) can be fabricated such that the two sides of the bipolar plate have different chemical and electrochemical properties, such as specified for compatibility with respective positive and negative active materials of the battery.

Silicon wafers are generally available in different sizes and shapes. For example, silicon wafers such as for use in photovoltaic applications can be obtained in a square geometry having sides of about 125 or about 156 millimeters. Although silicon wafers can be made extremely pure, metallurgical grade silicon can be produced economically and can be suitable for use as a substrate for a current collector. Silicon is generally impervious to sulfuric acid ($H_2SO_4$), and can be doped to achieve good electronic conductivity. For example, an electrical resistivity of <1 milli-Ohm-centimeter (mΩcm) can be provided at least in part using suitable doping. When used as a bipolar current collector in a bipolar lead acid battery, a silicon bipolar plate can provide an intercell electronic connection (e.g., through the silicon substrate) and at the same time such a collector configuration can isolate adjacent cells to inhibit electrolyte diffusion from cell-to-cell.

As mentioned above in relation to FIG. 2, on each side of the silicon substrate, a metal silicide can be formed on one or more surfaces of the substrate to provide an ohmic contact. According to an illustrative example, a metal silicide can be formed by first depositing a metal layer with thickness of about 50 to about 200 nanometers (nm) on the surface. The metal film can then be annealed such that it reacts with the underlying silicon to form a silicide layer on the silicon surface. As silicon is consumed and incorporated into the silicide layer, a resulting silicide is generally thicker than the deposited metal film. While many metals can be used to form silicides, one or more of nickel (Ni), cobalt (Co), titanium (Ti), tantalum (Ta), tungsten (W), or molybdenum (Mo) can be used to provide a silicide with low electrical resistivity (e.g., as shown generally in the illustrative examples of Table 1, below).

TABLE 1

Properties of metal silicides.

| Metal | Silicide | $\rho M$ ($\mu\Omega cm$) | $\rho S$ ($\mu\Omega cm$) | RTP Anneal Temp. (° C.) | $t_S/t_M$ |
|---|---|---|---|---|---|
| Ni | NiSi | 6.93 | 14-20 | 400-600 | 2.34 |
| Co | $CoSi_2$ | 6.24 | 14-20 | 600-800 | 3.52 |
| Ti | C54—$TiSi_2$ | 42 | 13-16 | 700-900 | 2.51 |
| Ta | C40—$TaSi_2$ | 13.1 | 35-55 | 800-1000 | 2.41 |
| W | C11b—$WSi_2$ | 5.28 | 30-70 | 800-1000 | 2.58 |
| Mo | C11b—$MoSi_2$ | 5.34 | 40-100 | 800-1000 | 2.59 |

For each metal, a specified low resistivity phase of silicide is listed, where $\rho M$ and $\rho S$ can represent the electrical resistivities of the metal and the metal silicide (in unites of micro-ohm-centimeters), respectively, and where $t_S/t_M$ can represent a ratio of the silicide film thickness to the original metal film thickness. RTP refers generally to "Rapid Thermal Processing." In an illustrative example, about 50 nanometers of nickel can be deposited on a silicon wafer surface by physical vapor deposition (PVD). The nickel film can then be annealed at about 480° C. for 2 minutes, such as to obtain a nickel silicide layer with a thickness of about 110 nanometers. As shown illustratively in FIG. 3A, a scanning electron micrograph 321A of the Si—NiSi illustrates generally a blurred interface between the two materials, which indicates that NiSi 306A forms a good ohmic contact with low contact resistance on the silicon 304 surface.

In another illustrative example, as shown in the scanning electron micrograph 321B of FIG. 3B, about 60 nanometers of titanium can be deposited on the silicon wafer surface, and the film can be annealed at about 860° C. for about 30 seconds. A resulting titanium silicide ($TiSi_2$) 306B can have a thickness of about 120 nanometers, and also forms a blurred interface with the underlying silicon 304.

Figure 4A:
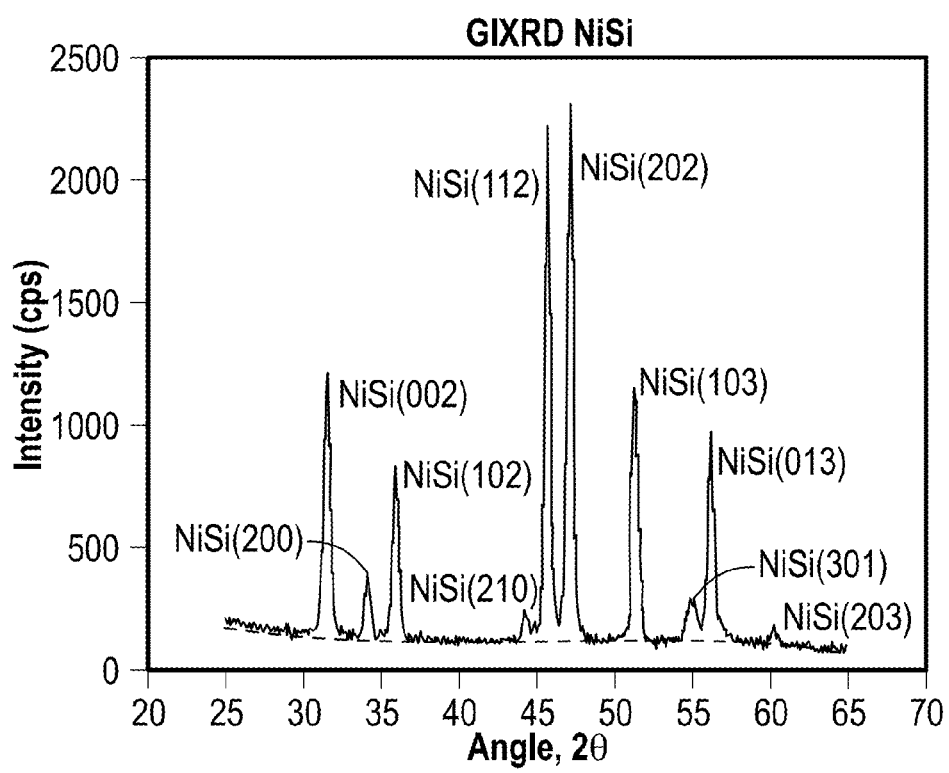
FIGS. 4A and 4B illustrate generally glancing incidence x-ray diffraction (XRD) spectra for a nickel silicide (NiSi) layer in FIG. 4A and titanium silicide ($TiSi_2$) in FIG. 4B.
Figure 4B:
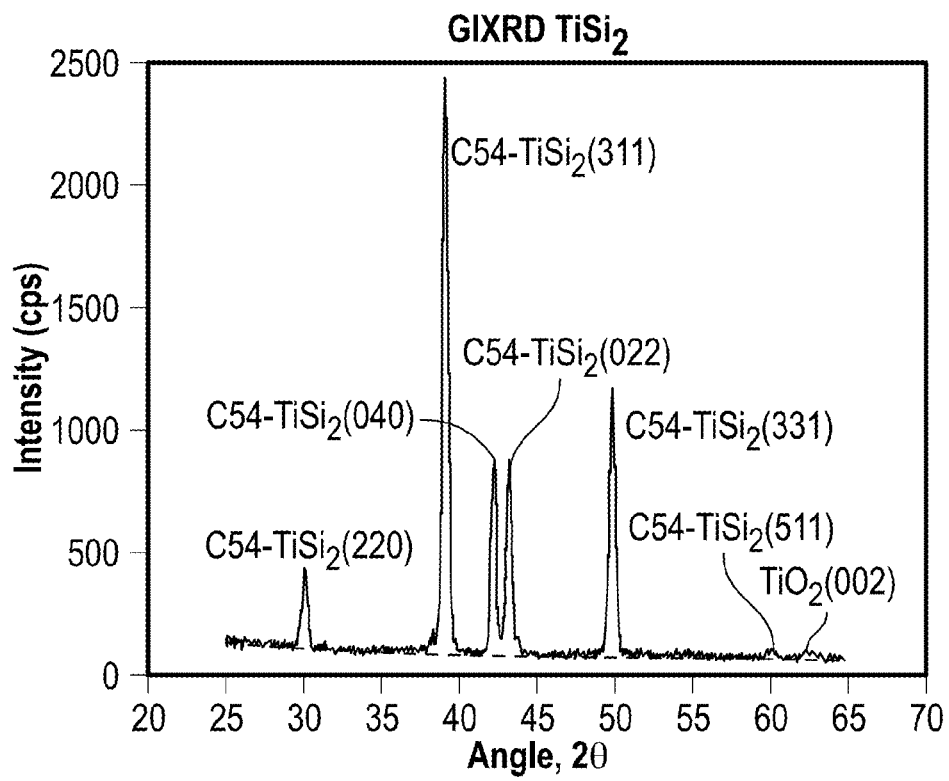

FIGS. 4A and 4B illustrate generally glancing incidence x-ray diffraction (XRD) spectra for a nickel silicide (NiSi) layer in FIG. 4A and titanium silicide ($TiSi_2$) in FIG. 4B. Multiple silicide phases can exist for a metal. Different phases of a silicide can have different electrical resistivity, and therefore one of the phases can be specified as desired for the ohmic contact layer when used on a silicon wafer current collector. Different silicide phases often have different annealing temperatures. Accordingly, a desired silicide phase can be obtained by a technique including rapid thermal processing (RTP), in which the annealing process parameters can be controlled precisely. Metal silicides formed with RTP generally have high phase purity as illustrated generally in the x-ray diffraction spectra of NiSi in FIG. 4A, and $TiSi_2$ in FIG. 4B. The NiSi of FIG. 4A can be formed by annealing 50 nm of Ni on silicon at 480° C. for 2 minutes, while the $TiSi_2$ of FIG. 4B can be obtained by annealing 60 nm of Ti on silicon at 860° C. for 30 seconds.

Figure 5A:
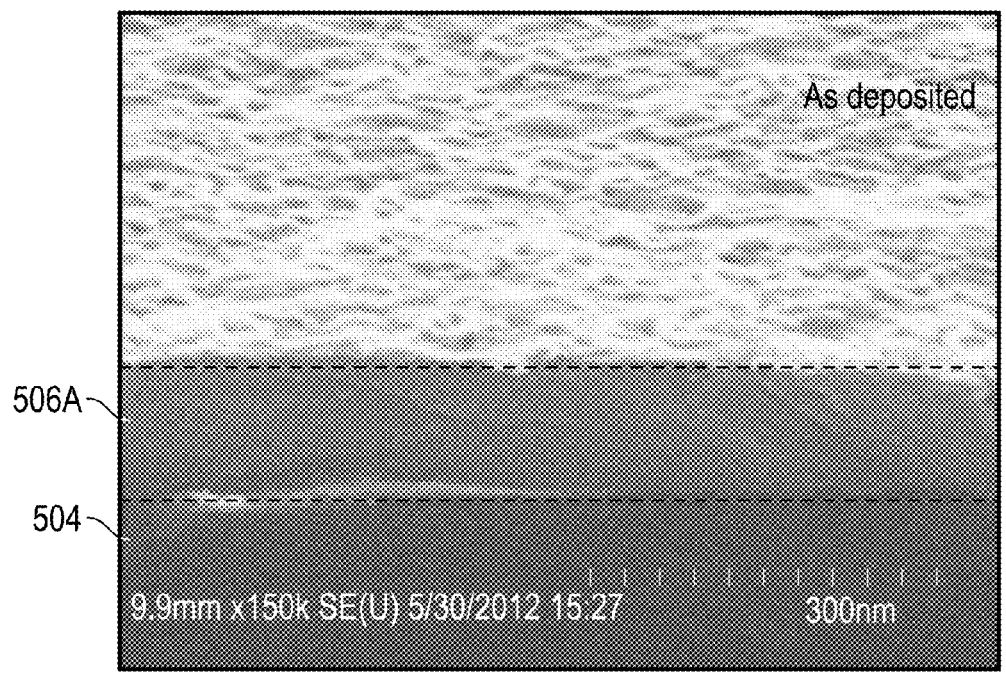
FIGS. 5A, 5B, and 5C illustrate generally various examples of scanning electron micrographs showing a nickel silicide after various durations of exposure to $H_2SO_4$.
Figure 5B:
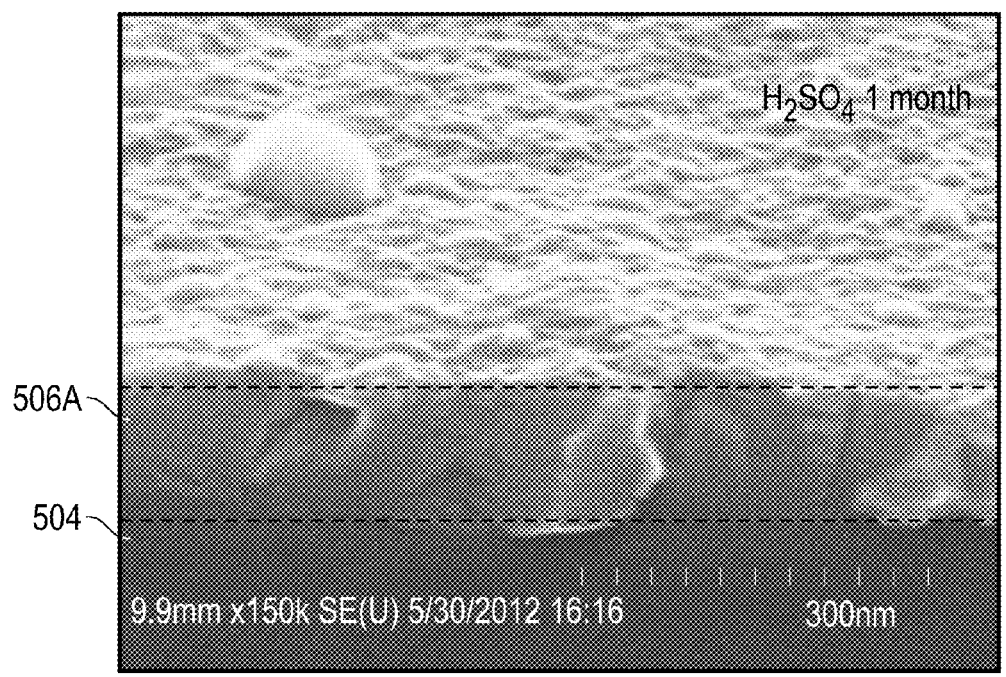
Figure 5C:
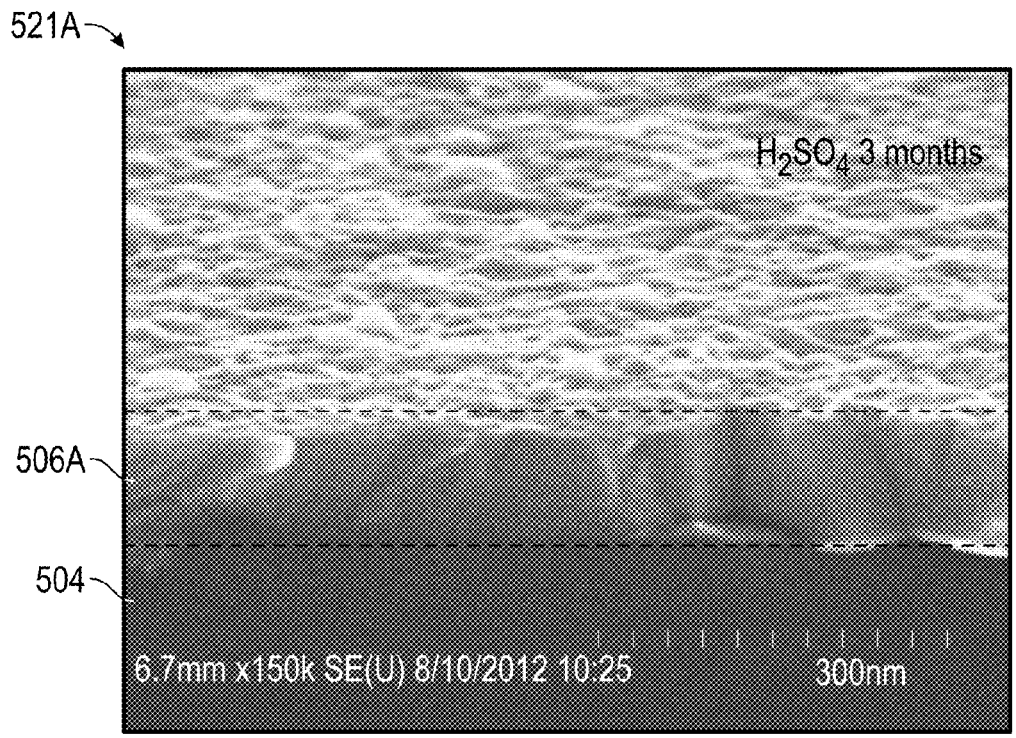

FIGS. 5A, 5B, and 5C illustrate generally various examples of scanning electron micrographs showing a nickel silicide after various durations of exposure to $H_2SO_4$. Chemically, metal silicides are generally stable towards $H_2SO_4$ corrosion. As shown in the illustrative example of FIGS. 5A, 5B, and 5C, scanning electron microscopy experiments illustrate generally that NiSi is stable towards $H_2SO_4$ corrosion when exposed to $H_2SO_4$ for an extended period of time. Specifically, when NiSi samples are immersed into $H_2SO_4$, the thickness of NiSi can remain stable, such as after an exposure duration of 6 months. In addition, no degradation of surface morphology or interface integrity is generally observed in the progression of FIGS. 5A, 5B, and 5C. The scanning electron micrographs 521A include NiSi 506A formed on Si 504 (imaged just after deposition) in FIG. 5A, NiSi 506A formed on Si 504 after exposure to $H_2SO_4$ for 1 month in FIG. 5B, and NiSi 506A formed on Si 504 after $H_2SO_4$ exposure for 3 months.

Figure 6:
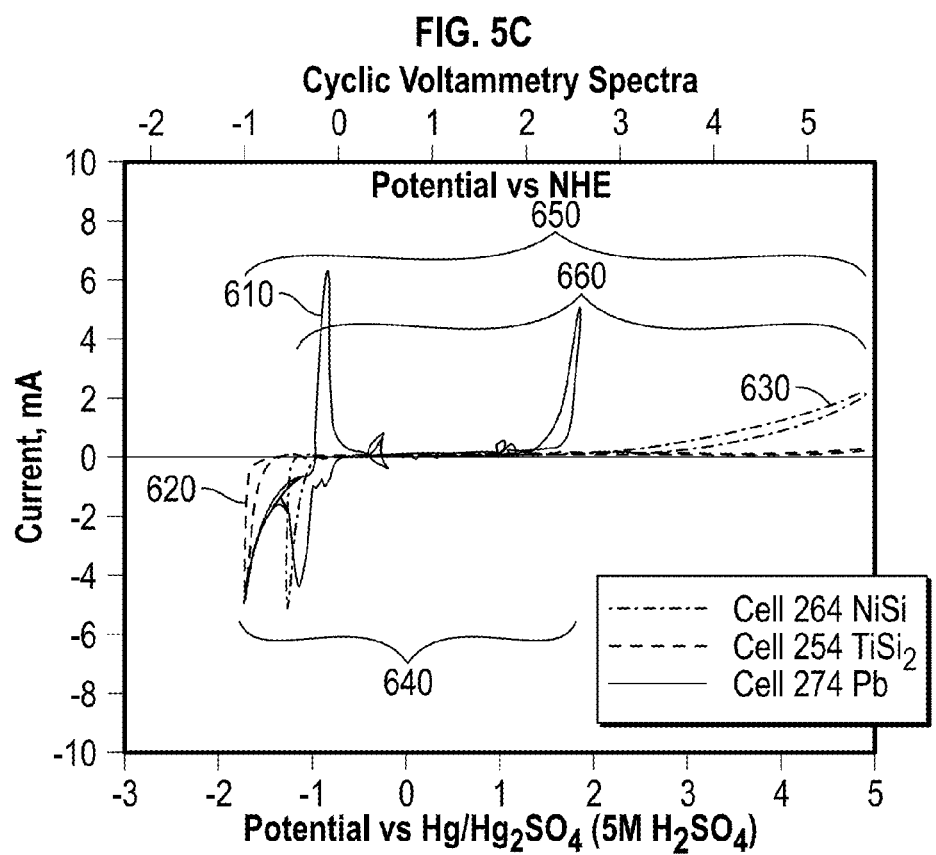
FIG. 6 illustrates generally cyclic voltammetry spectra of nickel silicide, titanium silicide, and lead surfaces.

FIG. 6 illustrates generally cyclic voltammetry spectra of nickel silicide 630, titanium silicide 620, and lead 610 surfaces. Positive current peaks indicate oxidation reactions, whereas negative peaks represent reduction reactions. The peaks at the highest and lowest potential for each surface are generally assigned to oxygen and hydrogen evolution, respectively. From the cyclic voltammetry, NiSi 630 and $TiSi_2$ 620 are both electrochemically inactive in the range 640 where electrochemical reactions occur on the Pb 610 surface.

A surface of a current collector is generally established to be electrochemically stable with respect to the electrochemical reactions of the surrounding battery chemistry (e.g., lead acid chemistry in the example of a lead acid battery). This is because side reactions can occur preferentially on the surface of the current collector, and reaction products can undesirably passivate the current collector surface, such as rendering it electrically insulating. Gas evolution reactions can accelerate active material detachment from the current collector. Such side reactions can contribute to premature efficiency loss, capacity degradation, and eventual failure of the battery. An electrochemical stability window 660 of NiSi 630 and a stability window 650 of $TiSi_2$ 620 can be compared with the window 640 of lead acid chemistry using cyclic voltammetry. The illustrative example of FIG. 6 illustrates generally that both NiSi 630 and $TiSi_2$ 620 have wider electrochemical stability windows 650 and 660 with respect to the charge-discharge electrochemical reactions of the lead acid battery as compared to the lead window 640. In particular, both NiSi 630 and $TiSi_2$ 620 have higher over-potential for oxygen evolution than a lead electrode, and both NiSi 630 and $TiSi_2$ 620 have high over-potential for hydrogen evolution. Experimentally-obtained results generally indicate that $TiSi_2$ 620 has a wider electrochemical stability window 650 than the window 660 of NiSi 630, as shown generally in FIG. 6.

Figure 7:
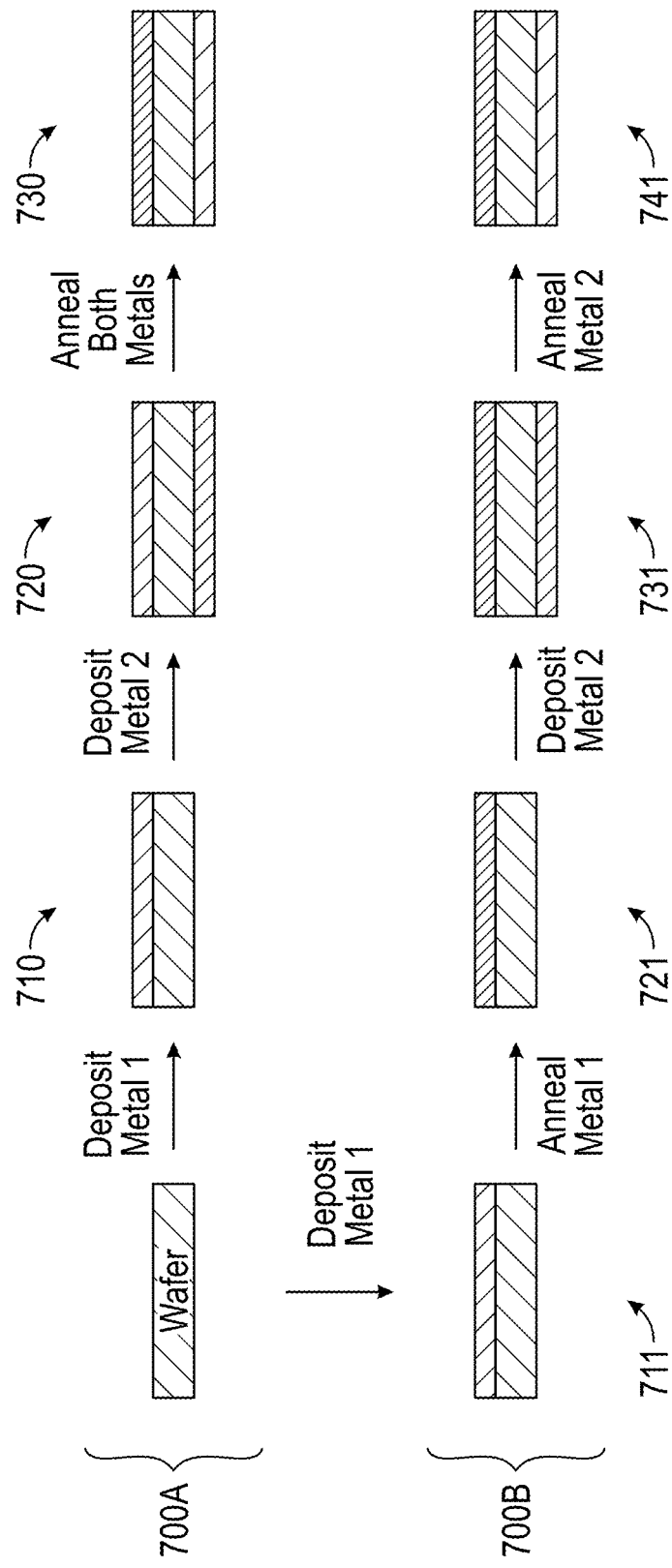
FIG. 7 illustrates generally examples of techniques, such as methods, that can be used to form silicides on silicon substrates.

FIG. 7 illustrates generally examples of techniques 700A and 700B, such as methods, that can be used to form silicides on silicon substrates. Fabrication of a current collector with the same metal silicide on both sides of the wafer can be performed by depositing a metal species onto both sides of the wafer. The wafer can then be annealed at the appropriate sintering temperature of the metal silicide. However, it can be desired to have two different silicides, with a unique silicide on each side of the wafer. For example, an oxidation-resistant surface with high oxidation evolution over-potential can be specified for a contact layer on a positive side of the bipolar plate, and a corrosion-resistant surface with high hydrogen evolution over-potential can be specified at a contact layer on a negative side of the bipolar plate. To fabricate a current collector with different metal silicide materials on respective sides of a silicon substrate (e.g., a wafer), a "single anneal" or a "double anneal" approach can be used, for example.

In the "single anneal" approach 700A, the two metal silicide materials can have similar formation temperatures.

For example, at 710, a first metal film can be deposited, such as using a vapor deposition technique. At 720, a different second metal film can be deposited, such as using a vapor deposition technique. At 730, both metals can be contemporaneously annealed using a temperature range sufficient to form both silicide layers. In an illustrative example, tantalum disilicide, $TaSi_2$, which has a high hydrogen evolution over-potential, can be used on the negative side of the bipolar plate, and tungsten disilicide $WSi_2$, which has slow surface oxidation rate, can be used on the positive side of the bipolar plate. These two silicides generally have similar formation temperatures, at about 1000° C., so a "single anneal" approach can be used. In an illustrative example of this approach, about 50 to about 200 nanometers of tantalum can be deposited onto a first surface of a silicon wafer, and about 50 to about 200 nanometers of tungsten deposited onto a second surface opposite the first surface. Generally, an order in which the two metals are deposited does not matter in this example. The wafer can then be annealed at a temperature of about 1000° C. to form $TaSi_2$ and $WSi_2$ contemporaneously. Such a "single anneal" approach can also be used with other metal silicide combinations that have similar formation temperatures.

In a "double anneal" approach 700B, two different metal silicides can be formed using different formation temperatures. For example, at 711, a metal with a higher silicide formation temperature can first be deposited onto a first surface of the silicon wafer, then at 721 the wafer can be annealed to form a first metal silicide. At 731, a second metal, which has a lower silicide formation temperature, can be deposited onto a second surface of the wafer opposite the first surface. At 741, the wafer can be annealed again. Because the first metal silicide is formed at a higher temperature, it can remain stable at the formation temperature of the second metal silicide if a peak temperature of the second annealing operation at 741 is specified to remain below a temperature range of the first annealing operation at 721, or if the thermal processing conditions are otherwise specified to inhibit damage to the first silicide layer formed during the first annealing operation. In an illustrative example, titanium disilicide $TiSi_2$ can be formed on the negative side of the bipolar plate, and a nickel silicide NiSi can be formed at the positive side of the bipolar plate. To fabricate a $TiSi_2$—NiSi bipolar plate, about 50 to about 200 nanometers of titanium (Ti) can be deposited onto one side of the wafer, then the wafer can be annealed from about 800° C. to about 900° C. to form titanium disilicide ($TiSi_2$). Then, about 50 to about 200 nanometers of nickel Ni can be deposited onto the other side of the wafer, followed by annealing from to about 450° C. to about 500° C. to form nickel silicide (NiSi). Because $TiSi_2$ is generally stable in the range from about 450° C. to about 500° C., it is not affected by the second annealing operation.

Additional layers can be deposited onto the surfaces of the current collector to improve adhesion to the active material layers. Such "adhesion" layers are generally also electrically conductive, chemically resistant to $H_2SO_4$ attack, and electrochemically stable. In an example, an additional layer can include lead (Pb), such as having a thicknesses from about 5 to about 100 micrometers. This additional layer can be deposited onto one or both sides of the current collector. In another example, a lead-tin alloy (Pb—Sn) can be deposited, such as to provide one or more adhesion layers. Different adhesion layers can be deposited onto respective sides of the current collector such that they are tailored to be compatible with the positive and negative active materials, respectively. In an illustrative example, lead (Pb) or lead-tin (Pb—Sn) can be deposited onto the negative side of the bipolar plate, whereas lead dioxide ($PbO_2$), tin dioxide ($SnO_2$), or lead-tin dioxide ($Pb_xSn_{1-x}O_2$) can deposited onto the positive side of the bipolar plate.

Figure 8:
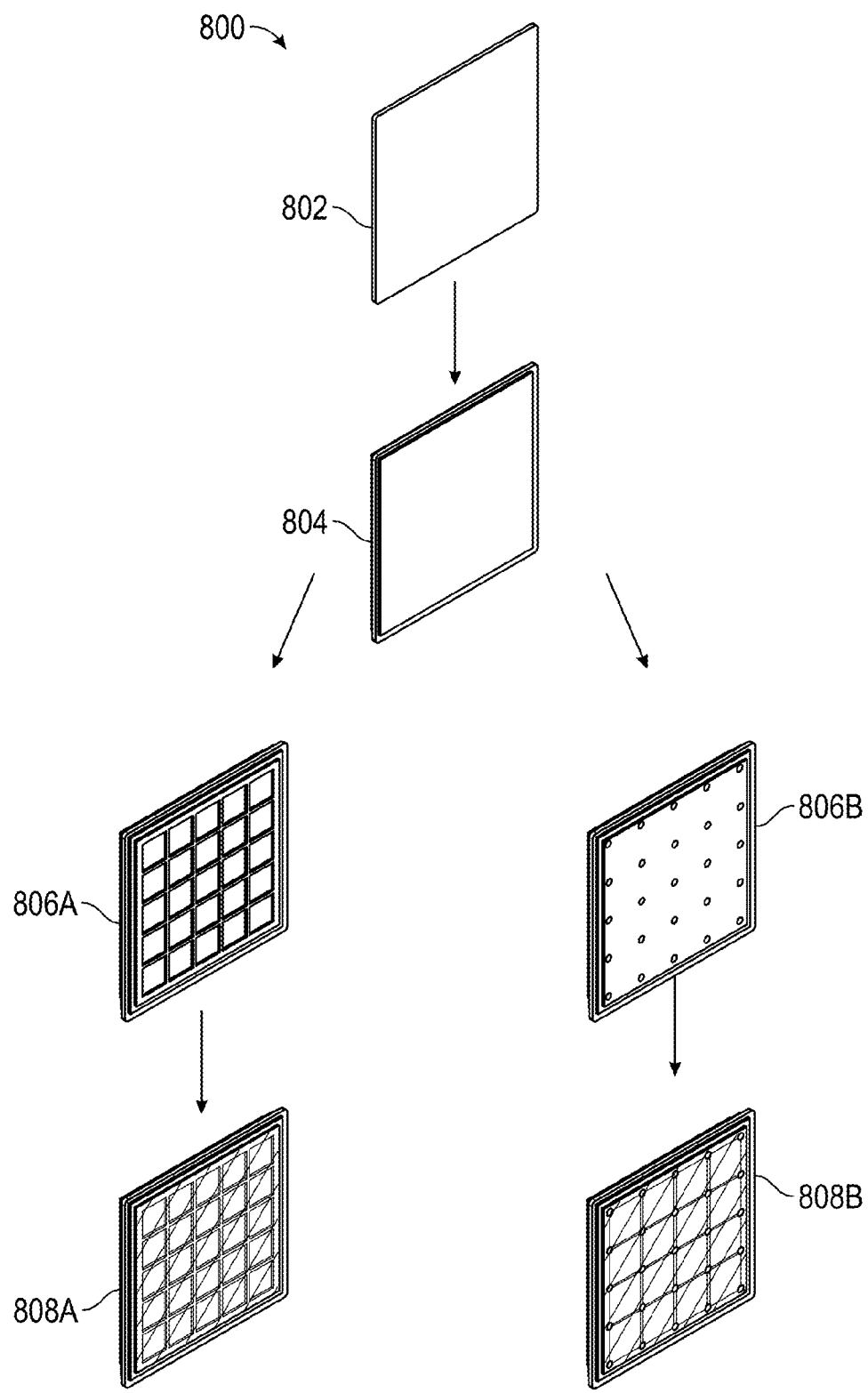
FIG. 8 illustrates generally a technique, such as method, that can include fabricating a bipolar battery plate including a silicon substrate included as a portion of a current collector, according to an example.

FIG. 8 illustrates generally a technique 800, such as method, that can include fabricating a bipolar battery plate including a silicon substrate included as a portion of a current collector, according to an example. The silicon substrate can include different silicide ohmic contact layers fabricated or configured as described in other examples herein.

At 802, a silicon substrate current collector can be formed. For example, a wafer can be sawed out of a single crystal boule, or otherwise formed such as from a slab of multi-crystalline silicon. The silicon wafer can be obtained having a first geometry (e.g., a circular wafer) then further cut to a desired geometry. The silicon wafer can be polished, etched, lapped, or otherwise processed to provide a desired surface finish. The silicon wafer can be doped to achieve a desired conductivity level, such as having a desired conductivity type (e.g., n-type doping).

At 804, an ohmic contact layer can be formed on at least one surface of the conductive silicon wafer. Such an ohmic contact layer can include a silicide. In an example, each face of the wafer can include an ohmic contact layer, and the ohmic contact layers on each face need not be the same material or thickness as each other. For example, the ohmic contact layers can include different silicides. One or more other layers (e.g., adhesion or barrier layers) can be included on one or more faces of the silicon wafer, such as deposited or otherwise formed upon one or more ohmic contact layers.

At 806A or 806B an arrayed pattern can be formed (such as placed or deposited) on the conductive silicon wafer, such as upon the ohmic contact layer, to provide or enhance mechanical support of the active material pastes. In one approach, at 806A, a square or rectangular grid pattern (e.g., a scaffold structure) can be formed, such having a thickness of around 100 micrometers to around 500 micrometers, or including another thickness. For example, such a grid can include Pb deposited on the surface of the conductive silicon wafer, such as by electrodeposition. Such electrodeposition can include use of a mechanical (e.g., contact) mask. In another example, the grid can include an acid-resistant polymer material.

In another approach, such as at 806B, an array of bumps or mesas can be formed (e.g., placed or deposited) on the current collector, such as by electrodeposition. In some examples, an array of Sn, Pb—Sn, or In—Sn solder pastes can be applied onto the current collector, such as by pasting, heat pressing, extrusion dispense, or screen printing. The array pattern can adhere naturally onto a Pb adhesion surface (e.g., adhesion layer) of the assembly. While the wafer, grid, and bump pattern configurations shown in FIG. 8 are rectangular, other shapes and symmetries can be used. In an example, an unmasked deposition can be used, such as followed by an etching process, to provide a specified pattern at 806A or 806B. In an example, one or more mesas or bumps can be from about 100 micrometers to about 500 micrometers in thickness, or can include another thickness. In an example, one or more lines or bumps can include Sb, Bi, In, Pb, Sn, Ag, or combinations thereof (e.g., an alloy).

At 808A or 808B, paste formulations and processing procedures compatible with generally-available lead acid batteries can be used to apply active material paste directly onto the silicon wafer assembly. For example, conductive silicon wafers can be made compatible with such pasting equipment, such as with modifications to adapt such equipment to the size of such wafers. Because silicon has a high melting point and good thermal conductivity, curing temperatures used for generally-available pasting processes can be used to cure active material pastes as a portion of the current collector assembly including the conductive silicon wafer. With higher curing temperatures, a mechanical support including a Pb grid array pattern or a Sn solder bump array can be fused with the active material pastes on the current collector, which can result in strong adhesion and desirable mechanical support.

Figure 9:
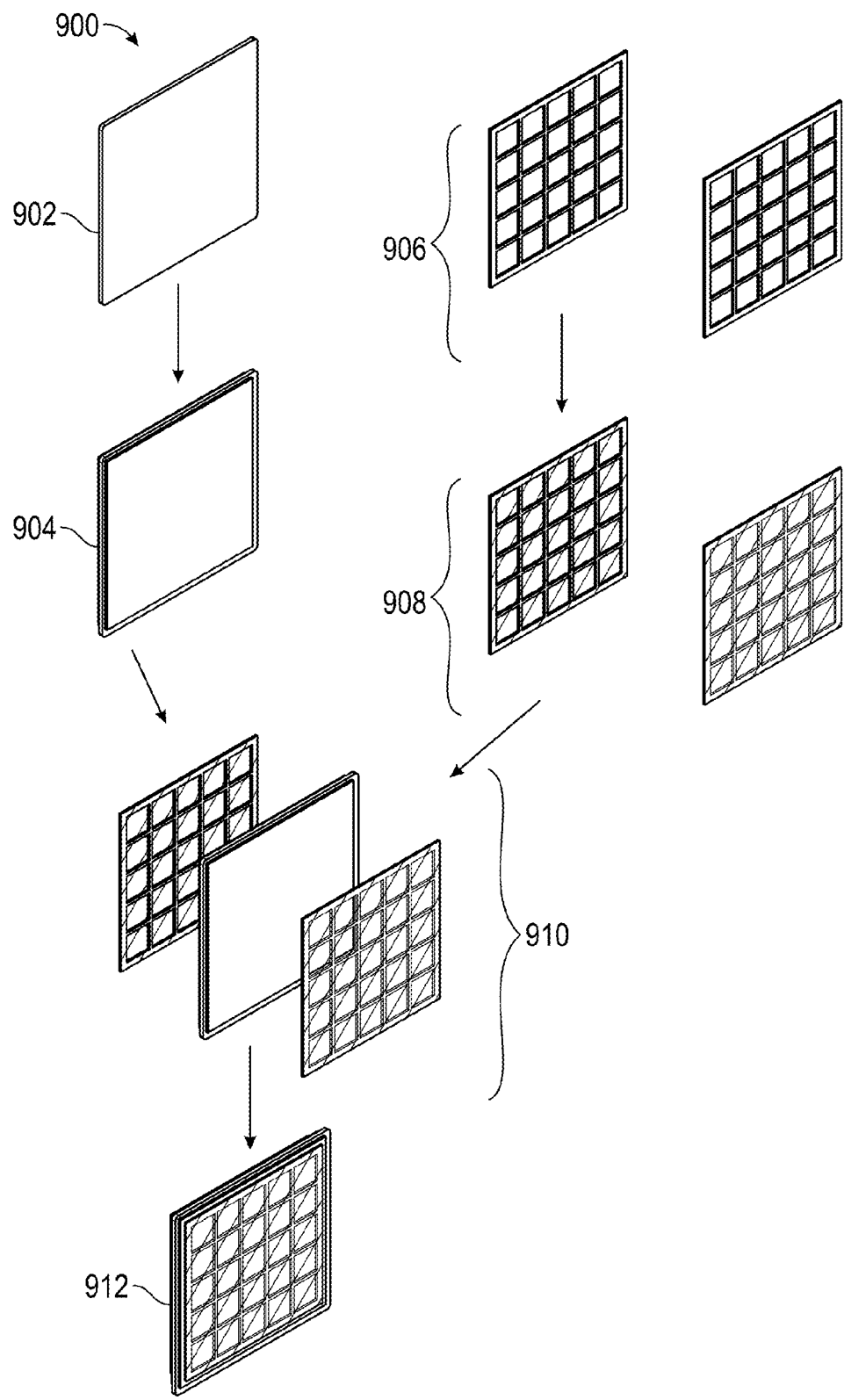
FIG. 9 illustrates generally a technique, such as method, that can include fabricating a bipolar battery plate including a silicon substrate included as a portion of a current collector, according to an example.

FIG. 9 illustrates generally a technique 900, such as method, that can include fabricating a bipolar battery plate including a silicon substrate included as a portion of a current collector, according to an example. In some cases, generally-available pasting equipment may not be suitable to directly apply an active material paste to a conductive silicon wafer current collector assembly. In cases where the silicon wafer current collector may be incompatible with the existing pasting equipment, active material pastes can be applied to "external" grids (e.g., scaffolds) before such grids are assembled with the conductive silicon wafer. For example, the external grid can be made of $H_2SO_4$ resistant plastic such as one or more of acrylonitrile butadiene styrene ("ABS"), low density polyethylene ("LDPE"), polypropylene ("PP"), polyvinylidene fluoride ("PVDF"), or polytetrafluoroethylene ("PTFE"). In an example, an external grid can be formed of carbon graphite, which can have an advantage of being electrically conductive. The pasted grids can be then sandwiched with the wafer collector, and cured to form a bipolar plate assembly (see, e.g., FIG. 2), such as a bipolar battery plate as described in other examples herein.

At 902, a conductive silicon wafer can be formed, such as using one or more techniques described elsewhere herein. At 904, one or more layers such as an ohmic contact or adhesion layer can be deposited, such as described in other examples elsewhere herein. At 906, an "external" mechanical support can be formed, such as can include a grid structure or other shape. As mentioned in examples elsewhere herein, such a mechanical support can be conductive or non-conductive. At 908, a paste material can be applied, such as a first polarity active material paste to a first mechanical support, and a second polarity active material paste to a second mechanical support. At 910, the first and second pasted mechanical supports can be applied to the conductive silicon wafer. At 912, one or more of the pastes can be cured, such as thermally.

To assemble the bipolar lead acid battery using a bipolar plate assembly as described in the examples herein, the bipolar plates (including conductive silicon wafers) can be sandwiched with separators. As shown and described elsewhere herein, gaps between the plates can be filed with an electrolyte (e.g., $H_2SO_4$). Edges of the bipolar plates can be sealed, so that each electrolyte compartment is electrically isolated. In an example, electrolyte can be integrated with a mechanical separator. For example, electrolyte can be mixed with silica dust to form an immobilized gel that can be referred to as a gelled electrolyte. In an example, absorbed glass mats (AGM) can be used, such as including electrolyte-saturated boron silicate mats as separators.

Battery plate assemblies can be one or more of encased or edge-sealed with mechanical casings. The casings can be made of plastics such as acrylonitrile butadiene styrene (ABS) plastic. In an example, the casing can be made from one or more of polypropylene (PP), polyvinyl chloride (PVC), or polytetrafluoroethylene (PTFE). In an example, plastics infused with fullerene particles, nanotubes, or graphene can be used to improve the thermal conductivity of the mechanical casings. The current collectors can be hermetically sealed to the mechanical casing such as using adhesives, or by contact without adhesives. In an example, the current collector can be edge-sealed directly onto a casing portion with an acid-resistant epoxy adhesive. In an example, a seal ring made of expanded PTFE can be epoxied onto the edge of the silicon current collector, and the sealed current collector can be adhered (e.g., epoxied) to the casing ring. In this example, the expanded PTFE seal ring acts can be configured as a shock absorber between the current collector and the casing. In an example, current collectors are edges sealed to the casing using compressible seal ring materials.

Various Notes & Examples

Example 1 can include or use subject matter (such as an apparatus, a method, a means for performing acts, or a device readable medium including instructions that, when performed by the device, can cause the device to perform acts), such as can include forming a bipolar battery plate, including depositing a first metal layer on a first surface of a rigid silicon substrate, depositing a different second metal layer on a second surface of the rigid silicon substrate opposite the first surface, and annealing the first and second metal layers to form a first silicide on the first surface and a different second silicide on the second surface of the rigid silicon substrate.

Example 2 can include, or can optionally be combined with the subject matter of Example 1, to optionally include annealing the first and second metal layers to form the first and second silicides including annealing the silicon wafer using a temperature range sufficient to form both silicide layers contemporaneously Example 3 can include, or can optionally be combined with the subject matter of one or any combination of Examples 1 or 2 to optionally include a first silicide comprising tantalum disilicide, and a second silicide comprising tungsten disilicide.

Example 4 can include, or can optionally be combined with the subject matter of Example 1 to optionally include annealing the first and second metal layers including annealing the first metal layer to form the first silicide using a first annealing temperature range and separately annealing the second metal layer to form the second silicide using a second annealing temperature range.

Example 5 can include, or can optionally be combined with the subject matter of Example 4 to optionally include a peak of the second annealing temperature range lower than temperatures within the first annealing temperature range, wherein the first silicide remains stable within the second annealing temperature range.

Example 6 can include, or can optionally be combined with the subject matter of one or any combination of Examples 4 or 5 to optionally include a first silicide comprising titanium silicide, and a second silicide comprising nickel silicide.

Example 7 can include, or can optionally be combined with the subject matter of one or any combination of Examples 1 through 6 to optionally include first and second silicides comprising contact layers, and where a first adhesion layer is deposited on the first silicide, and where a second adhesion layer is deposited on the second silicide.

Example 8 can include, or can optionally be combined with the subject matter of Example 7 to optionally include at least one of the first and second adhesion layers comprising one of a soft metal, a metal alloy, or a metal oxide.

Example 9 can include, or can optionally be combined with the subject matter of one or any combination of Examples 7 or 8 to optionally include at least one of the first or second adhesion layers comprising one or more of lead or tin.

Example 10 can include, or can optionally be combined with the subject matter of one or any combination of Examples 7 through 9 to optionally include at least one of the first or second adhesion layers comprising a compound including lead and oxygen.

Example 11 can include, or can optionally be combined with the subject matter of one or any combination of Examples 7 through 10 to optionally include first and second adhesion layers comprising the same material.

Example 12 can include, or can optionally be combined with the subject matter of one or any combination of Examples 7 through 10 to optionally include a first adhesion layer comprising a first material, and a second adhesion layer comprising a different second material.

Example 13 can include, or can optionally be combined with the subject matter of one or any combination of Examples 7 through 12 to optionally include first and second adhesion layers specified for compatibility with lead acid battery chemistry.

Example 14 can include, or can optionally be combined with the subject matter of one or any combination of Examples 7 through 13 to optionally include applying a first active material having a first conductivity type to the first adhesion layer, and applying a second active material having an opposite second conductivity type to the second adhesion layer.

Example 15 can include, or can optionally be combined with the subject matter of one or any combination of Examples 1 through 14 to include, subject matter (such as an apparatus, a method, a means for performing acts, or a machine readable medium including instructions that, when performed by the machine, that can cause the machine to perform acts), such as can include forming a bipolar battery plate, including depositing a first metal layer on a first surface of a rigid silicon substrate, depositing a different second metal layer on a second surface of the rigid silicon substrate opposite the first surface, annealing the first and second metal layers to form a first silicide on the first surface and a different second silicide on the second surface of the rigid silicon substrate, including annealing the silicon wafer using a temperature range sufficient to form both silicide layers contemporaneously, depositing a first adhesion layer on the first silicide, and depositing a second adhesion layer on the second silicide.

Example 16 can include, or can optionally be combined with the subject matter of Example 15, to optionally include a first silicide comprising tantalum disilicide, and a second silicide comprising tungsten disilicide.

Example 17 can include, or can optionally be combined with the subject matter of one or any combination of Examples 15 or 16 to optionally include at least one of the first or second adhesion layers including one or more of lead (Pb) or tin (Sn).

Example 18 can include, or can optionally be combined with the subject matter of one or any combination of Examples 1 through 14 to include, subject matter (such as an apparatus, a method, a means for performing acts, or a machine readable medium including instructions that, when performed by the machine, that can cause the machine to perform acts), such as can include forming a bipolar battery plate, including depositing a first metal layer on a first surface of a rigid silicon substrate, depositing a different second metal layer on a second surface of the rigid silicon substrate opposite the first surface, annealing the first and second metal layers to form a first silicide on the first surface and a different second silicide on the second surface of the rigid silicon substrate including annealing the first metal layer to form the first silicide using a first annealing temperature range, and separately annealing the second metal layer to form the second silicide using a second annealing temperature range, depositing a first adhesion layer on the first silicide, depositing a second adhesion layer on the second silicide. In Example 18, a peak of the second annealing temperature range can be lower than temperatures within the first annealing temperature range, and the first silicide remains stable within the second annealing temperature range.

Example 19 can include, or can optionally be combined with the subject matter of Example 18, to optionally include a first silicide comprising titanium silicide and a second silicide comprising nickel silicide.

Example 20 can include, or can optionally be combined with the subject matter of one or any combination of Examples 18 or 19 to optionally include at least one of the first or second adhesion layers includes one or more of lead or tin.

Example 21 can include, or can optionally be combined with any portion or combination of any portions of any one or more of Examples 1 through 20 to include, subject matter that can include means for performing any one or more of the functions of Examples 1 through 20, or a machine-readable medium including instructions that, when performed by a machine, cause the machine to perform any one or more of the functions of Examples 1 through 20.

Each of these non-limiting examples can stand on its own, or can be combined in various permutations or combinations with one or more of the other examples.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The claimed invention is:

1. A method for forming a bipolar battery plate, comprising:
   depositing a first metal layer on a first surface of a rigid silicon substrate;
   depositing a different second metal layer on a second surface of the rigid silicon substrate opposite the first surface; and
   annealing the first and second metal layers to form a first silicide on the first surface and a different second silicide on the second surface of the rigid silicon substrate.

2. The method of claim 1, wherein the annealing the first and second metal layers to form the first and second silicides comprises annealing the silicon wafer using a temperature range sufficient to form both silicide layers contemporaneously.

3. The method of claim 2, wherein the first silicide comprises tantalum disilicide; and
   wherein the second silicide comprises tungsten disilicide.

4. The method of claim 1, wherein annealing the first and second metal layers comprises annealing the first metal layer to form the first silicide using a first annealing temperature range; and
   separately annealing the second metal layer to form the second silicide using a second annealing temperature range.

5. The method of claim 4, wherein a peak of the second annealing temperature range is lower than temperatures within the first annealing temperature range; and
   wherein the first silicide remains stable within the second annealing temperature range.

6. The method of claim 4, wherein the first silicide comprises titanium silicide; and
   wherein the second silicide comprises nickel silicide.

7. The method of claim 1, wherein the first and second silicides comprise contact layers; and
   wherein the method includes:
      depositing a first adhesion layer on the first silicide; and
      depositing a second adhesion layer on the second silicide.

8. The method of claim 7, wherein at least one of the first and second adhesion layers include one of a soft metal, a metal alloy, or a metal oxide.

9. The method of claim 8, wherein at least one of the first or second adhesion layers includes one or more of lead or tin.

10. The method of claim 8, wherein at least one of the first or second adhesion layers includes a compound comprising lead and oxygen.

11. The method of claim 7, wherein the first and second adhesion layers include the same material.

12. The method of claim 7, wherein the first adhesion layer comprises a first material, and the second adhesion layer comprises a different second material.

13. The method of claim 7, wherein the first and second adhesion layers are specified for compatibility with lead acid battery chemistry.

14. The method of claim 7, comprising applying a first active material having a first conductivity type to the first adhesion layer; and
   applying a second active material having an opposite second conductivity type to the second adhesion layer.

15. A method for forming a bipolar battery plate, comprising:
   depositing a first metal layer on a first surface of a rigid silicon substrate;
   depositing a different second metal layer on a second surface of the rigid silicon substrate opposite the first surface; and
   annealing the first and second metal layers to form a first silicide on the first surface and a different second silicide on the second surface of the rigid silicon substrate, including annealing the silicon wafer using a temperature range sufficient to form both silicide layers contemporaneously;
   depositing a first adhesion layer on the first silicide; and
   depositing a second adhesion layer on the second silicide.

16. The method of claim 15, wherein the first silicide comprises tantalum disilicide; and
   wherein the second silicide comprises tungsten disilicide.

17. The method of claim 15, wherein the at least one of the first or second adhesion layers include one or more of lead (Pb) or tin (Sn).

18. A method for forming a bipolar battery plate, comprising:
   depositing a first metal layer on a first surface of a rigid silicon substrate;

depositing a different second metal layer on a second surface of the rigid silicon substrate opposite the first surface; and annealing the first and second metal layers to form a first silicide on the first surface and a different second silicide on the second surface of the rigid silicon substrate including annealing the first metal layer to form the first silicide using a first annealing temperature range; and separately annealing the second metal layer to form the second silicide using a second annealing temperature range;

depositing a first adhesion layer on the first silicide; and depositing a second adhesion layer on the second silicide;

wherein a peak of the second annealing temperature range is lower than a peak of the first annealing temperature range; and wherein the first silicide remains stable within the second annealing temperature range.

19. The method of claim 18, wherein the first silicide comprises titanium silicide; and wherein the second silicide comprises nickel silicide.

20. The method of claim 18, wherein at least one of the first or second adhesion layers includes one or more of lead or tin.

* * * * *